US012683819B2

(12) United States Patent
Schmelzle

(10) Patent No.: US 12,683,819 B2
(45) Date of Patent: Jul. 14, 2026

(54) SYSTEMS AND METHODS FOR GENERATING, MANAGING, AND DISPLAYING NON-FUNGIBLE DIGITAL REPRESENTATIONS OF LIVING, BIOLOGICAL, AND/OR EUKARYOTIC ORGANISMS

(71) Applicant: Laurie Schmelzle, Seneca, KS (US)

(72) Inventor: Laurie Schmelzle, Seneca, KS (US)

( * ) Notice: Subject to any disclaimer, the term of this patent is extended or adjusted under 35 U.S.C. 154(b) by 106 days.

(21) Appl. No.: 18/712,493

(22) PCT Filed: Dec. 16, 2022

(86) PCT No.: PCT/US2022/053182
§ 371 (c)(1),
(2) Date: May 22, 2024

(87) PCT Pub. No.: WO2023/114476
PCT Pub. Date: Jun. 22, 2023

(65) Prior Publication Data
US 2025/0300846 A1    Sep. 25, 2025

Related U.S. Application Data

(60) Provisional application No. 63/305,223, filed on Jan. 31, 2022, provisional application No. 63/291,065, filed on Dec. 17, 2021.

(51) Int. Cl.
*H04L 9/00* (2022.01)

(52) U.S. Cl.
CPC ...................................... *H04L 9/50* (2022.05)

(58) Field of Classification Search
CPC ......... H04L 9/50; G16B 50/30; G06Q 30/018
See application file for complete search history.

(56) References Cited

U.S. PATENT DOCUMENTS

| | | | | |
|---|---|---|---|---|
| 11,170,582 B1 * | 11/2021 | McNeil | ................. | G06F 16/483 |
| 11,748,630 B1 * | 9/2023 | Juneja | .................. | H04L 9/3231 |
| | | | | 709/223 |
| 2007/0166707 A1 * | 7/2007 | Schadt | .................. | G16B 40/20 |
| | | | | 702/20 |

(Continued)

OTHER PUBLICATIONS

International Search Report and Written Opinion, PCT Application Serial No. PCT/US2022/053182, dated May 30, 2023, issued by International Search Authority US.

(Continued)

*Primary Examiner* — Blake I Narramore
(74) *Attorney, Agent, or Firm* — ROEDER & BRODER LLP; James P. Broder; Devin R. Vaage

(57) ABSTRACT

The present invention generally relates to systems (100) and methods for generating, managing, and displaying non-fungible digital representations (102) of living, biological, and/or eukaryotic organisms (104). More specifically, the systems (100) and methods for generating, managing, and displaying non-fungible digital representations (102) include genetic material (106), such as single nucleotide polymorphisms. The systems (100) and methods can record genetic data from the genetic material (106) on a blockchain (114) and can generate and display the non-fungible digital representation (102) of the living, biological, and/or eukaryotic organisms (104) that are based on the genetic data on the blockchain (114).

19 Claims, 5 Drawing Sheets

(56) References Cited

U.S. PATENT DOCUMENTS

| | | | | |
|---|---|---|---|---|
| 2009/0307179 A1* | 12/2009 | Colby | ................... | G16H 10/40 |
| | | | | 706/54 |
| 2016/0335412 A1* | 11/2016 | Tucker | ................... | G06F 30/20 |
| 2017/0232300 A1* | 8/2017 | Tran | ........................ | G06F 1/163 |
| | | | | 434/247 |
| 2018/0235194 A1* | 8/2018 | Fahrenkrug | .......... | C12N 15/907 |
| 2021/0118085 A1* | 4/2021 | Bushnell | ................... | H04L 9/50 |
| 2021/0243027 A1* | 8/2021 | Gupta | ................... | H04L 9/3213 |
| 2022/0069996 A1* | 3/2022 | Xue | ...................... | H04L 9/3297 |
| 2022/0116231 A1* | 4/2022 | Choi | ................. | G06Q 10/0832 |
| 2022/0222668 A1* | 7/2022 | Blackburn | ............. | G06Q 40/08 |

OTHER PUBLICATIONS

International Preliminary Report on Patentability issued by the ISA/US for PCT Application Serial No. PCT/US2022/053182, dated Jun. 20, 2024.

* cited by examiner

GATHER GENETIC MATERIAL AND/OR BIOMETRICS FROM A EUKARYOTIC ORGANISM _230

GENERATE GENETIC DATA AND/OR BIOMETRIC DATA FROM THE GENETIC MATERIAL AND/OR BIOMETRICS _232

RECORD THE GENETIC DATA AND/OR THE BIOMETRIC DATA ON A BLOCKCHAIN _234

GENERATE A NON-FUNGIBLE DIGITAL REPRESENTATION OF THE EUKARYOTIC ORGANISM BASED ON THE GENETIC DATA AND/OR THE BIOMETRIC DATA _236

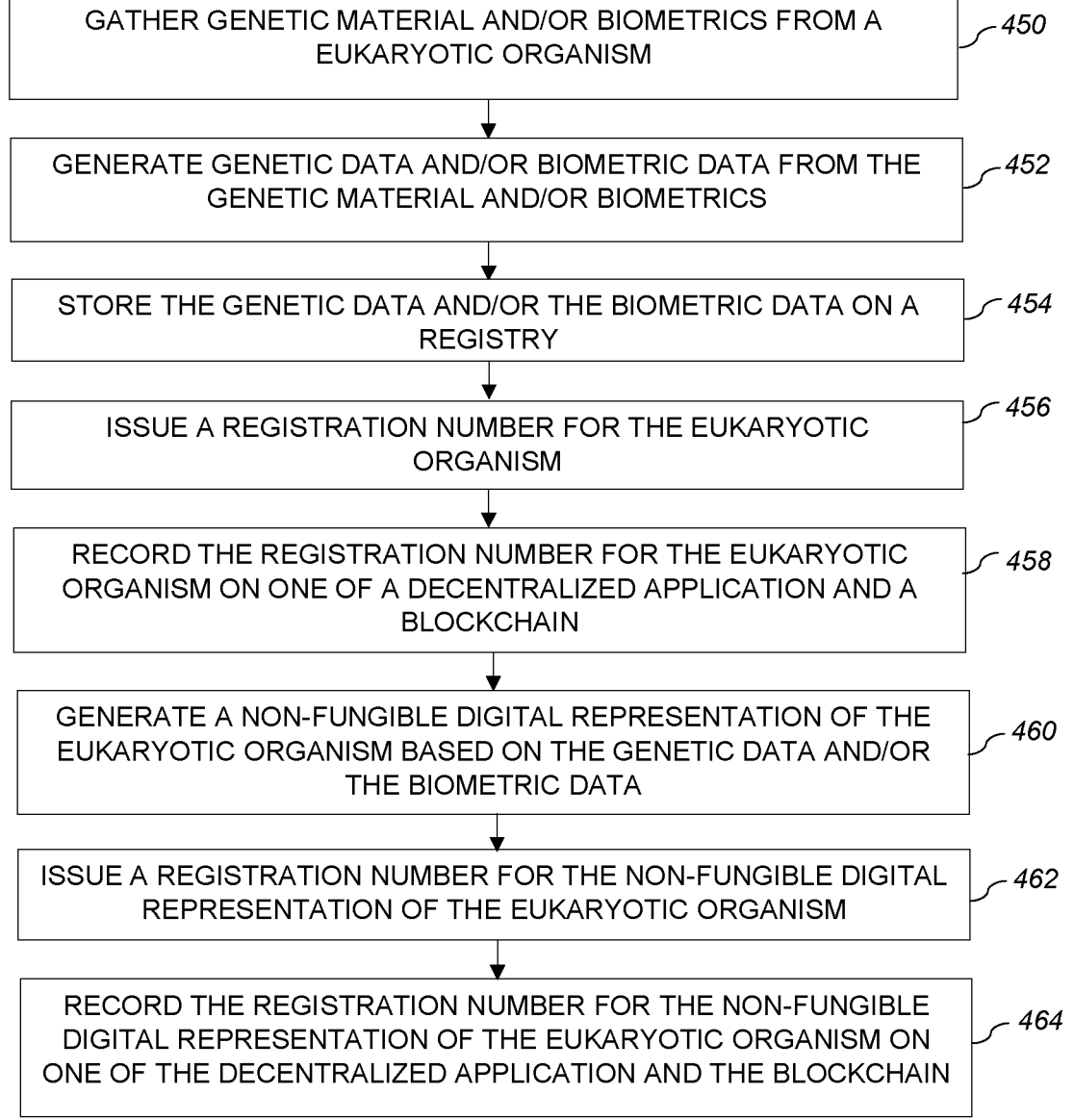

GATHER GENETIC MATERIAL AND/OR BIOMETRICS FROM A EUKARYOTIC ORGANISM ⟋450

GENERATE GENETIC DATA AND/OR BIOMETRIC DATA FROM THE GENETIC MATERIAL AND/OR BIOMETRICS ⟋452

STORE THE GENETIC DATA AND/OR THE BIOMETRIC DATA ON A REGISTRY ⟋454

ISSUE A REGISTRATION NUMBER FOR THE EUKARYOTIC ORGANISM ⟋456

RECORD THE REGISTRATION NUMBER FOR THE EUKARYOTIC ORGANISM ON ONE OF A DECENTRALIZED APPLICATION AND A BLOCKCHAIN ⟋458

GENERATE A NON-FUNGIBLE DIGITAL REPRESENTATION OF THE EUKARYOTIC ORGANISM BASED ON THE GENETIC DATA AND/OR THE BIOMETRIC DATA ⟋460

ISSUE A REGISTRATION NUMBER FOR THE NON-FUNGIBLE DIGITAL REPRESENTATION OF THE EUKARYOTIC ORGANISM ⟋462

RECORD THE REGISTRATION NUMBER FOR THE NON-FUNGIBLE DIGITAL REPRESENTATION OF THE EUKARYOTIC ORGANISM ON ONE OF THE DECENTRALIZED APPLICATION AND THE BLOCKCHAIN ⟋464

*FIG. 4*

SYSTEMS AND METHODS FOR GENERATING, MANAGING, AND DISPLAYING NON-FUNGIBLE DIGITAL REPRESENTATIONS OF LIVING, BIOLOGICAL, AND/OR EUKARYOTIC ORGANISMS

RELATED APPLICATIONS

This application claims the benefit of U.S. Provisional Patent Application Ser. No. 63/291,065, filed Dec. 17, 2021, and entitled "SYSTEMS AND METHODS FOR GENERATING, MANAGING, AND DISPLAYING NON-FUNGIBLE DIGITAL REPRESENTATIONS OF LIVING ORGANISMS," and U.S. Provisional Patent Application Ser. No. 63/305,223, filed Jan. 31, 2022, and entitled "SYSTEMS AND METHODS FOR GENERATING, MANAGING, AND DISPLAYING NON-FUNGIBLE DIGITAL REPRESENTATIONS OF EUKARYOTIC ORGANISMS." As far as permitted, the contents of U.S. Provisional Application Nos. 63/291,065 and 63/305,223 are incorporated in their entirety herein by reference.

FIELD OF INVENTION

The present invention relates to systems and methods for generating, managing, and displaying non-fungible digital representations of living, biological, and/or eukaryotic organisms. More specifically, the present invention relates to systems and methods for generating, managing, and displaying non-fungible digital representations of biometric data, including but not limited to the genetic material of these organisms, such as single nucleotide polymorphisms.

BACKGROUND

Due to the escalating and rapidly approaching advances in the digital and largely blockchain technology-based Web3 world, the lines between virtual and real can become blurred, driving creativity, and accelerating innovation at an exponential pace. As such, both digital and tangible assets can be more challenging to authenticate and safeguard. This can be especially true, for example, with living organisms or nucleic acid residues obtained from various sources.

Because biological/living/eukaryotic organisms can be cloned and/or counterfeited in the real world, it can be increasingly more challenging to secure their authenticity. Previous registration methods to authenticate the purity and identity of living organisms, for example, animals such as Arabian horses, typically were based on the word and/or reputation of the region or tribe from where these horses originated. Later, methods for identifying animals included ear tags, hot/freeze brands, tattoos, hair swirls, blood typing, nucleic acid typing, or combinations thereof—many adjoined with registries.

However, there are disadvantages associated with the aforementioned methods. For example, ear tags could be lost, switched, or fraudulently manufactured; and unofficial brand tooling could be manufactured. Properly registered horses of similar age and color could be switched inadvertently or intentionally.

Other methods later included genetic typing involving nucleic acids such as deoxyribonucleic acid (DNA). However, there were limitations since these methods typically could not differentiate between parent organisms and clones, or between daughter clones, easily or at all. However, clones have both phenotypic and biometric differences, and in practical use cases, clones may also have genotypic differences.

More recent methods have included, for example, older microsatellite marker polymerase chain reaction (PCR) testing which generally use a relatively small number of markers. As such, when performing parentage verification, this method could definitively 'disqualify' an individual as a parent, but had limitations to definitively 'qualify' an individual as a parent.

Additionally, assets like art, music, real estate, and entire businesses can be created, bought, and sold all in the digital space. These creative works and transactions can be recorded and governed by a blockchain or a similar decentralized system. Humans can have virtual avatars in these digital, three-dimensional spaces. Eukaryotic organisms other than humans are often cloned and/or counterfeited, and it can be challenging to determine the authenticity of the eukaryotic organism. Furthermore, there are issues determining ownership of eukaryotic organisms, such as pets.

Other entities have devised their own solutions for strengthening the authenticity of living organisms. For example, published photographs on a public access database are typically displayed on a website of the animals available for sale or export. The animals can be accompanied by a corresponding "Certificate of Authenticity," designed such that it cannot be altered without being destroyed. The Certificate of Authenticity includes an ID number, and instructions on how to view images of that animal. In addition to the animal's ID number, these "Certificates" often include stats, and instructions on how to view images of the corresponding animal. New owners of these animals can compare the animal in hand to its pictures displayed on a secure public-access database located on servers controlled by the website. This can allow for phenotype to phenotype comparison. Although this method can provide authentication/identity verification, as the world moves toward Web3, better, stronger animal authentication methods must be available.

At the present time, there exists a need for systems and methods to distinguish, differentiate and authenticate living, biological, eukaryotic organisms, and genetic material of these organisms and parts thereof, that are accurate, efficient, low cost, and not time-consuming.

Moreover, these systems and methods can be useful for improving the authenticity, and their applications are used for many purposes.

SUMMARY

The present embodiment is directed to a system for generating, managing, and displaying a non-fungible digital representation of living, biological, and/or eukaryotic organisms. More specifically, the present invention relates to systems and methods for generating, managing, and displaying non-fungible digital representations of genetic material, such as single nucleotide polymorphisms.

In a typical embodiment of the present invention, a system for generating, managing, and displaying a non-fungible digital representation of a eukaryotic organism. In one implementation, the system includes: a blockchain and a database. The database can include a processor and a non-transitory computer-readable medium having instructions stored thereon, which are executable by the processor. When the instructions stored on the non-transitory computer-readable medium are executed by the processor, the processor causes the system to (i) generate genetic data that is based on gathered genetic material from the eukaryotic organism, (ii) record the genetic data on the blockchain, and (iii) generate and display the non-fungible digital representation of the eukaryotic organism that is based on the genetic data on the blockchain.

In certain implementations, the non-fungible digital representation of the eukaryotic organism includes a virtual twin of the eukaryotic organism.

In various implementations, the genetic data includes genetic material comprising deoxyribonucleic acid data, ribonucleic acid data, single nucleotide polymorphisms data, and nucleic acid fragments, alone and/or in combination thereof, collected from the eukaryotic organism.

In some implementations, the genetic data includes biometric data.

In various implementations, the biometric data includes, but is not limited to, genetic material of the organism, such as single nucleotide polymorphisms.

In still other implementations, the genetic material includes single nucleotide polymorphisms.

In certain implementations, the biometric data includes at least one of (i) vocalization data of the eukaryotic organism, (ii) eye characteristics of the eukaryotic organism, (iii) stride identifiers of the eukaryotic organism, (iv) circadian patterns of the eukaryotic organism, and (v) health data of the eukaryotic organism. In various implementations, the non-fungible digital representation of the eukaryotic organism includes the biometric data.

In some implementations, the non-fungible digital representation of the eukaryotic organism includes a non-fungible token that demonstrates ownership of at least one of the eukaryotic organism and the non-fungible digital representation of the eukaryotic organism.

In certain implementations, the non-fungible token is configured to be minted with metadata that includes at least one of a total number of (i) virtual twins, and (ii) eukaryotic clones of the eukaryotic organism.

In various implementations, the blockchain includes a blockchain ledger that is updated by every recordation on the blockchain.

The present embodiment is further directed toward a method for generating, managing, and displaying a non-fungible digital representation of a eukaryotic organism. In various implementations, the method can include the steps of generating genetic data that is based on gathered genetic material from the eukaryotic organism, recording the genetic data on a blockchain, and generating and displaying the non-fungible digital representation of the eukaryotic organism that is based on the genetic data on the blockchain.

In some implementations, the non-fungible digital representation of the eukaryotic organism includes a virtual twin of the eukaryotic organism.

In certain implementations, the genetic data includes genetic material comprising deoxyribonucleic acid data, ribonucleic acid data, single nucleotide polymorphisms data, and nucleic acid fragments, alone and/or in combination thereof, collected from the eukaryotic organism.

In various implementations, the genetic data includes biometric data.

In some implementations, the genetic data includes biometric data including but not limited to genetic material of the organism such as single nucleotide polymorphisms.

In some implementations, the biometric data includes at least one of (i) vocalization data of the eukaryotic organism, (ii) eye characteristics of the eukaryotic organism, (iii) stride identifiers of the eukaryotic organism, (iv) circadian patterns of the eukaryotic organism, and (v) health data of the eukaryotic organism.

In certain implementations, the non-fungible digital representation of the eukaryotic organism includes the biometric data.

In various implementations, the non-fungible digital representation of the eukaryotic organism includes a non-fungible token that demonstrates ownership of at least one of the eukaryotic organism and the non-fungible digital representation of the eukaryotic organism.

In some implementations, the non-fungible token is configured to be minted with metadata that includes a total number of (i) virtual twins, and (ii) eukaryotic clones of the eukaryotic organism.

In other implementations, the non-fungible token is configured to be minted with metadata that includes a total number of (i) virtual twins, (ii) eukaryotic clones of the eukaryotic organisms, and (iii) virtual twins of the clones.

In certain implementations, the blockchain includes a blockchain ledger that is updated by every recordation on the blockchain.

In various implementations, the non-fungible digital representation of the eukaryotic organism is configured to be displayed in at least one of a virtual world, an augmented reality, and a hologram.

The present embodiment is also directed toward a method for generating, managing, and displaying a non-fungible digital representation of a eukaryotic organism. In various implementations, the method can include the steps of gathering genetic material from the eukaryotic organism, generating genetic data that is based on gathered genetic material from the eukaryotic organism, recording the genetic data on a blockchain, and generating and displaying the non-fungible digital representation of the eukaryotic organism that is based on the genetic data on the blockchain.

The present embodiment is further directed toward a system for generating, managing, and displaying a non-fungible digital representation of a eukaryotic organism. In various embodiments, the system includes a registry. The registry includes a processor and a non-transitory computer-readable medium having instructions stored thereon which are executable by the processor and which, when executed, cause the system to generate genetic data that is based on gathered genetic material from the eukaryotic organism; store the genetic data on the registry; issue a registration number for the eukaryotic organism based on the genetic data stored on the registry; and generate and display the non-fungible digital representation of the eukaryotic organism that is based on the genetic data.

In certain embodiments, the non-fungible digital representation of the eukaryotic organism includes a virtual twin of the eukaryotic organism.

In some embodiments, the genetic data includes genetic material comprising deoxyribonucleic acid data, ribonucleic acid data, single nucleotide polymorphisms data, and nucleic acid fragments, alone or in combination thereof, collected from the eukaryotic organism.

In various embodiments, the genetic data includes biometric data.

In various implementations, the genetic data includes biometric data including but not limited to genetic material of the organism such as single nucleotide polymorphisms.

In still other implementations, the genetic material includes single nucleotide polymorphisms.

In certain embodiments, the biometric data includes at least one of (i) vocalization data of the eukaryotic organism,

5

(ii) eye characteristics of the eukaryotic organism, (iii) stride identifiers of the eukaryotic organism, (iv) circadian patterns of the eukaryotic organism, (v) health data of the eukaryotic organism and (vi) face scans of the eukaryotic organism.

In various embodiments, the face scans include triangulation of features, facial recognition algorithms, machine learning algorithms, convolutional neural networks, and face templates.

In some embodiments, the non-fungible digital representation of the eukaryotic organism includes the biometric data.

In various embodiments, the non-fungible digital representation of the eukaryotic organism includes a non-fungible token that demonstrates ownership of at least one of the eukaryotic organism and the non-fungible digital representation of the eukaryotic organism.

In certain embodiments, the non-fungible token is configured to be minted with metadata that includes a total number of (i) virtual twins, (ii) eukaryotic clones of the eukaryotic organism, and (iii) virtual twins of the clones.

In some embodiments, the system further includes a smart contract that includes the registration number for the eukaryotic organism based on the genetic data stored on the registry.

In various embodiments, the system further includes a decentralized application that is connected to the registry.

The present application is still further directed toward a method for generating, managing, and displaying a non-fungible digital representation of a eukaryotic organism.

In certain embodiments, the method includes the steps of generating genetic data that is based on gathered genetic material from the eukaryotic organism; storing the genetic data on the registry; issuing a registration number for the eukaryotic organism based on the genetic data stored on the registry; and generating and displaying the non-fungible digital representation of the eukaryotic organism that is based on the genetic data.

The present application is also directed toward a system for generating, managing, and displaying a non-fungible digital representation of a eukaryotic organism.

In various embodiments, the system includes a blockchain and a database. The database can include a processor and a non-transitory computer-readable medium having instructions stored thereon which are executable by the processor and which, when executed, cause the system to: generate biometric data that is based on biometrics obtained from the eukaryotic organism; record the biometric data on the blockchain; and generate and display the non-fungible digital representation of the eukaryotic organism that is based on the biometric data.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE DRAWINGS

The novel features of this embodiment, as well as the embodiment itself, both as to its structure and its operation, will be best understood from the accompanying drawings, taken in conjunction with the accompanying description, in which similar reference characters refer to similar parts, and in which:

FIG. 4 is a flow chart that illustrates yet another method for generating, managing, and displaying non-fungible digital representations of eukaryotic organisms.

Figure 1:
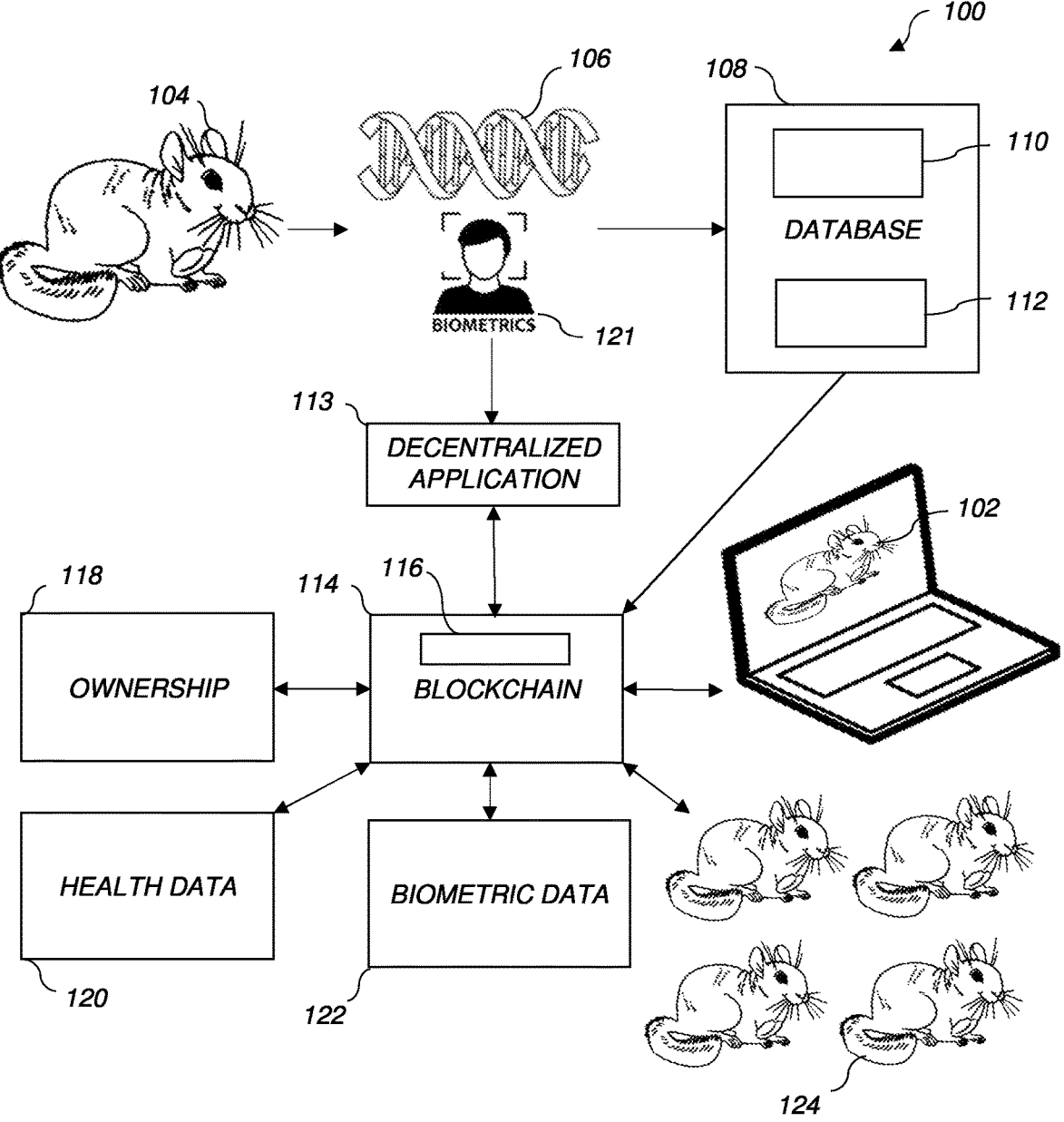
FIG. 1 is a block diagram of one embodiment of a system for generating, managing, and displaying non-fungible digital representations of eukaryotic organisms having features of the present invention.

While embodiments are susceptible to various modifications and alternative forms, specifics thereof have been shown by way of examples and drawings, and will be described in detail. It should be understood, however, that the scope herein is not limited to the particular aspects described. On the contrary, the intention is to cover modifications, equivalents, and alternatives falling within the spirit and scope herein.

DESCRIPTION

Embodiments of the present invention are described herein in the context of systems and methods for generating, managing, and displaying a non-fungible digital representation of a living, biological, and/or eukaryotic organism. More specifically, the present invention relates to systems and methods for generating, managing, and displaying non-fungible digital representations of biometric data, including but not limited to genetic material such as single nucleotide polymorphisms. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention, as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it is appreciated that such a development effort might be complex and time-consuming. Still, it would nevertheless be a routine undertaking of engineering for those of ordinary skill in the art having the benefit of this disclosure.

Embodiments of the present invention provide a solution to improve the accuracy and can exploit phenotypic, biometric, and sometimes genotypic variations to strengthen the registration of the organisms and meet the aforementioned needs.

More recently, the use of single nucleotide polymorphisms (SNPs) for genetic analysis (for example, DNA analysis) has come to the forefront. In a preferred embodiment of the present invention, the use of SNP data is a marked improvement over the aforementioned systems and methods using microsatellite marker data for animal registration and other purposes. For example, instead of using one to two dozen microsatellite markers, the sample size can be increased to 150-3,000 or higher with SNPs. The larger sample size of SNP data can dramatically decrease the number of 'eligible' candidates when used for parentage verification, thus giving much higher assurance of identity verification, and also allowing for more genotype markers that can be cross-referenced with phenotype. One skilled in the art can appreciate that SNPs can be less expensive to process.

In a preferred embodiment of the present invention, as can be appreciated, methods of identifying and using SNPs and SNP panels known to those skilled in the art can be used.

In accordance with a preferred embodiment of the present invention, a non-fungible digital representation (NFDR) is a virtual title of ownership on a blockchain. The non-fungible digital representation (NFDR) can further include a non-fungible token (NFT).

According to an embodiment, the present invention seeks to strengthen and validate the identity, parentage, and/or ownership through registration of these organisms by recording biometric data from the organism in the metadata of the NFDR and/or NFT, coupled with one or more digital likenesses of the organism, recorded on a blockchain. Preferably, this NFDR and/or NFT will provide both genotypic and phenotypic sampling of the organism, recorded on a permanent, unchangeable, and decentralized blockchain.

In a most preferred embodiment of the present invention, an example would include, but not be limited to, recording a sample size of single nucleotide polymorphisms (SNPs), along with one or more digital likenesses of the organism, into the metadata of the NFT via a JSON or other file of the smart contract located on a blockchain.

Because biological/living/eukaryotic organisms can be cloned and/or counterfeited in the real world, it will be increasingly more challenging to secure their authenticity in the metaverse. Additionally, past registration methods could not differentiate between parent organisms and clones, or between daughter clones, easily or at all. However, clones have both phenotypic and biometric differences, and in practical use cases, clones may also have genotypic differences.

According to yet another embodiment of the present invention, the systems and methods disclosed can utilize phenotypic, biometric, and genotypic variations to strengthen the registration of the organisms. Regarding genotypic variations, clones produced by any current cloning methods often use a technique called somatic cell cloning. Disadvantages of somatic cell cloning methods generally are known to those skilled in the art, including the inability to render an exact genetic duplicate.

Typically, mitochondrial DNA (mtDNA) inherited by a cloned offspring typically comes from a denucleated donor egg, not from the parent organism being cloned. With somatic cell cloning, a donor-denucleated egg is injected with body cell DNA from the organism being cloned (or parent organism). The resulting 'daughter' organism has most of its DNA from the parent organism, but its mtDNA comes from the denucleated egg, not from the parent organism. The mtDNA inherited by the daughter organism from the denucleated egg can then be passed on to any offspring of the cloned/daughter organism.

In a most preferred embodiment of the present invention, mtDNA SNPs can be included in the metadata of the NFT of a cloned organism, to help differentiate between clones. Additionally, the invention can make use of multi-tiered biometric sampling, recorded in the metadata, to strengthen the registration of clones.

For example:

Tier 1 metadata.—SNPs including+mtDNA SNPs Tier 2, 3, 4, 5, . . . metadata—Species-dependent biometric data that demonstrates variation even among twins or clones such as including but not limited to iris scans, stride identifiers, vocalizations, fingerprints, etc.

In yet another preferred embodiment of the present invention, images recorded on NFTs have the additional advantage of being able to be updated as imaging advances, as the organism ages, or just at will. For example, an image on an NFT used for registration purposes, produced in the year 2021, can be updated 20 years later. An NFT allows for 2D imaging, 3D imaging, video, imaging specific to augmented reality, AI-rendered moving images, and even images created from DNA and/or other biometric data. As DNA sequencing becomes easier and less expensive, which is already happening at an exponential pace, the invention may allow for genomes, sequenced in their entirety, to be included in the registration of these organisms.

Historically, it is known to those skilled in the art that registration has helped to increase an organism's value. However, previously when that organism died, the value of the registration died with it. Typically, old registration papers were just discarded or surrendered to the registry and canceled. Embodiments of the present invention disclosed will allow the owner of the organism to retain the registration's value beyond the death of the organism. The uses for the invention will be for registration and beyond. Embodiments of the present invention will give owners of these registered organisms an entry point into Web3 and the metaverse, where that organism can exist and hold value indefinitely.

Furthermore, the embodiments of the present invention will allow registered organisms to be identified, parentage verified, bought, sold, leased, syndicated, inherited, etc., globally, quickly, and more inexpensively and efficiently than with prior registries. Typically, the registry will be global, with transactions occurring anywhere in the world almost instantaneously on a publicly distributed ledger.

Additionally, according to embodiments disclosed herein, the NFDRs and NFTs for these biometrically authenticated registered organisms can be used for countless other purposes, including but not limited to membership, entertainment, marketing, avatars, collateral, etc., which may all add value to the NFDRs and NFTs.

In an alternative preferred embodiment, the present invention allows for the creation of 'digital twins' of the registered organisms, each of which will have its own value. Preferably, an NFT can also be created for a 'virtually-genetically enhanced,' or 'genetically modified fanciful' version of the registered organism, or with options the owner can modify and customize over time.

In yet another alternate embodiment, to further strengthen the registration of the organism, the present invention may place either a visible, invisible, or encrypted trademarked brand onto the associated non-fungible digital representations and/or non-fungible tokens located on a blockchain.

In yet another preferred embodiment, the present invention may also use genetic material, including genes, patented genes, gene sequences, or patented gene sequences, inserted into an organism, and recorded on the organism's associated non-fungible digital representations and/or tokens, located on a blockchain, to further strengthen the registration of the organism.

In a preferred embodiment, a registry database, based on non-fungible digital representations and/or non-fungible tokens, including biometric data of that organism, operating on blockchain technology has the capacity to give the viewer/user the ability to access an image, biometric data, and/or ownership of an organism, and then instantly navigate to a parent, offspring, or sibling of that organism.

In yet still another preferred embodiment of the present invention, entire genomes can be recorded within the non-fungible digital representations and/or non-fungible tokens, or in a registration database connected to the non-fungible digital representations and/or non-fungible tokens, for identity verification, parentage verification, and/or registration purposes.

The present invention can further include non-fungible digital representations and/or non-fungible tokens issued for cloning rights to organisms, cell lines of organisms, the right to produce one or more registered or non-registered clones from an organism or cell line, the right to produce a genetically modified version of a given organism, and/or produce a registered or unregistered live or virtual version of the subsequent genetically modified organism.

Additionally, embodiments of the present invention may incorporate registration data, including biometric data, from other registries, into non-fungible digital representations and/or non-fungible tokens recorded on a blockchain, to further strengthen the registration of the organism.

According to one embodiment, the present invention seeks to tie a real-world biological, living, and/or eukaryotic organism or genetic material thereof, to its virtual twin(s), based on the genetic material of the organism, and to assign a certificate of ownership to the virtual asset in the form of a non-fungible digital representation or NFT, or another blockchain-based system. Preferably, according to a preferred embodiment, the systems and methods give value to the digital asset/twin, by tethering it to its real-world biological/living/eukaryotic organism counterpart. Typically, the genetic material includes deoxyribonucleic acid, ribonucleic acid, single nucleotide polymorphisms (SNPs), mitochondrial single nucleotide polymorphisms (mtSNPs), nucleic acid fragments alone and/or combinations thereof. Preferably, the genetic material includes single nucleotide polymorphisms (SNPs).

Biometrics/DNA/Genetic Data Digital Twin(s),
  of (eukaryotic) organism | - - - | NFDR, and/or NFT
    or similar According to one embodiment of the present invention, a registry of title of ownership of the biological organism+ digital twin, also accounts for and limits any real-world clones and/or digital twin clones that can be created.

The valuation of non-fungible digital assets in general, including NFDRs and NFTs, is often influenced by rarity, exclusivity, utility, and branding/marketing. Those skilled in the art can appreciate the valuation of live animals typically can be largely dependent on skillful breeding, exclusivity, utility (for example, competition, shows, racing, etc.), and also branding and/or marketing. In consideration of the issuance of non-fungible tokens or representations of biological/living/eukaryotic organisms, the present invention tethers the digital representations of organisms to the organisms themselves. From a purely fanciful standpoint, it is tempting to produce vast troves of the most appealing digital organisms, but akin to releasing an entire trove of synthetic diamonds onto the market at once, this scenario would devalue all of the most appealing digital organisms. Just as the USD dollar was once backed by gold, the present invention seeks to issue non-fungible digital representations backed by eukaryotic 'gold,' (i.e., the living organism itself). The digital assets disclosed in various embodiments of the present invention include biometric data from the biological/living/eukaryotic organism, and/or genetic material of the organism, such as SNPs, further assuring the owner/buyer of the exclusivity of the digital asset. Conversely, the value of the real-world organism will benefit by having its counterpart represented digitally, in limited supply, in a decentralized world.

In an embodiment of the present invention, the organism can include biological organisms, living organisms, eukaryotic organisms, and non-human eukaryotes. The organism includes organisms of the kingdoms Animalia, Plantae, and Fungi; and non-human organisms of the kingdoms Animalia, Plantae, and Fungi. The organism includes and is not limited to species including *Equus caballus, Canis lupus, Felis catus, Bos Taurus, Ovis aries, Capra hircus, Lama glama, Vicugna pacos, Mustela putorius, Mustela lutreola, Neovison vison, Oryctolagus cuniculus, Tursiops truncatus, Stenella frontalis, Monodon monoceros, Cyprinusrubrofuscus, Pavo cri status, Chinchilla chinchilla*, and *Chinchilla lanigera*.

Referring to the figures, FIG. 1 is a block diagram of one embodiment of a system 100 for generating, managing, and displaying a non-fungible digital representation 102 of a eukaryotic organism 104. The system 100 can vary depending on its design requirements. It is understood that the system 100 can include additional systems, subsystems, components, and elements than those specifically shown and/or described herein. Additionally, or alternatively, the system 100 can omit one or more of the systems, subsystems, and elements that are specifically shown and/or described herein.

In the embodiment illustrated in FIG. 1, the system 100 can include the non-fungible digital representation 102, the eukaryotic organism 104, genetic material 106 of the eukaryotic organism 104, a database 108 including a processor 110 and a non-transitory computer-readable medium 112, a blockchain 114 having a blockchain ledger 116, a decentralized application 113, an ownership record 118, health data 120, biometrics 121 of the eukaryotic organism, biometric data 122, and/or physical clones 124 of the eukaryotic organism 104.

The non-fungible digital representation 102 represents the eukaryotic organism 104 in any suitable digital space, including virtual worlds, augmented reality, and/or holograms. The non-fungible digital representation 102 can vary depending on the design requirements of the system 100.

In certain embodiments, the non-fungible digital representation 102 can include a non-fungible token (NFT), for example an ERC-721, or any suitable type of NFT. In some embodiments, each minted non-fungible digital representation 102 can be coupled or de-coupled to the eukaryotic organism. For example, if the eukaryotic organism 104 has deceased or the non-fungible digital representation 102 has been visually and/or biometrically altered from the eukaryotic organism 104. Every issued non-fungible digital representation 102 may be represented by a separate NFT that is minted with separate metadata. The metadata can include the number of issued non-fungible digital representations 102, ownership records 118, health data 120, biometric data 122, and/or any suitable metadata. The metadata can be recorded on the blockchain 114 via the blockchain ledger 116 and provides a technical solution to enabling the owner of the eukaryotic organism 104 to confirm the authenticity of the non-fungible digital representation 102 and/or the eukaryotic organism 104.

The eukaryotic organism 104 can include any suitable eukaryotic organisms, such as animals, plants, and/or bacteria, as non-exclusive, non-limiting examples. In the embodiment illustrated in FIG. 1, the eukaryotic organism 104 is a *chinchilla* for ease of reference throughout the system 100. In other embodiments, the eukaryotic organism 104 can include living organisms, nonliving organisms (e.g., dead), cloned organisms, reanimated organisms, embryos, cell lines, cell cultures, temporal stasis organisms, and/or any suitable organism in any suitable state.

The genetic material 106 can be collected from the eukaryotic organism 104. The genetic material 106 can be in the form of a reference sample, including blood, oral swabs, buccal swabs, and/or plucked hairs from the eukaryotic organism. The genetic material 106 can also be DNA-typed. Typically, the genetic material 106 can include a nucleic acid including deoxyribonucleic acid data, ribonucleic acid data, single nucleotide polymorphisms data, and nucleic acid fragments, alone or in combination thereof, collected from the eukaryotic organism.

Figure 3:
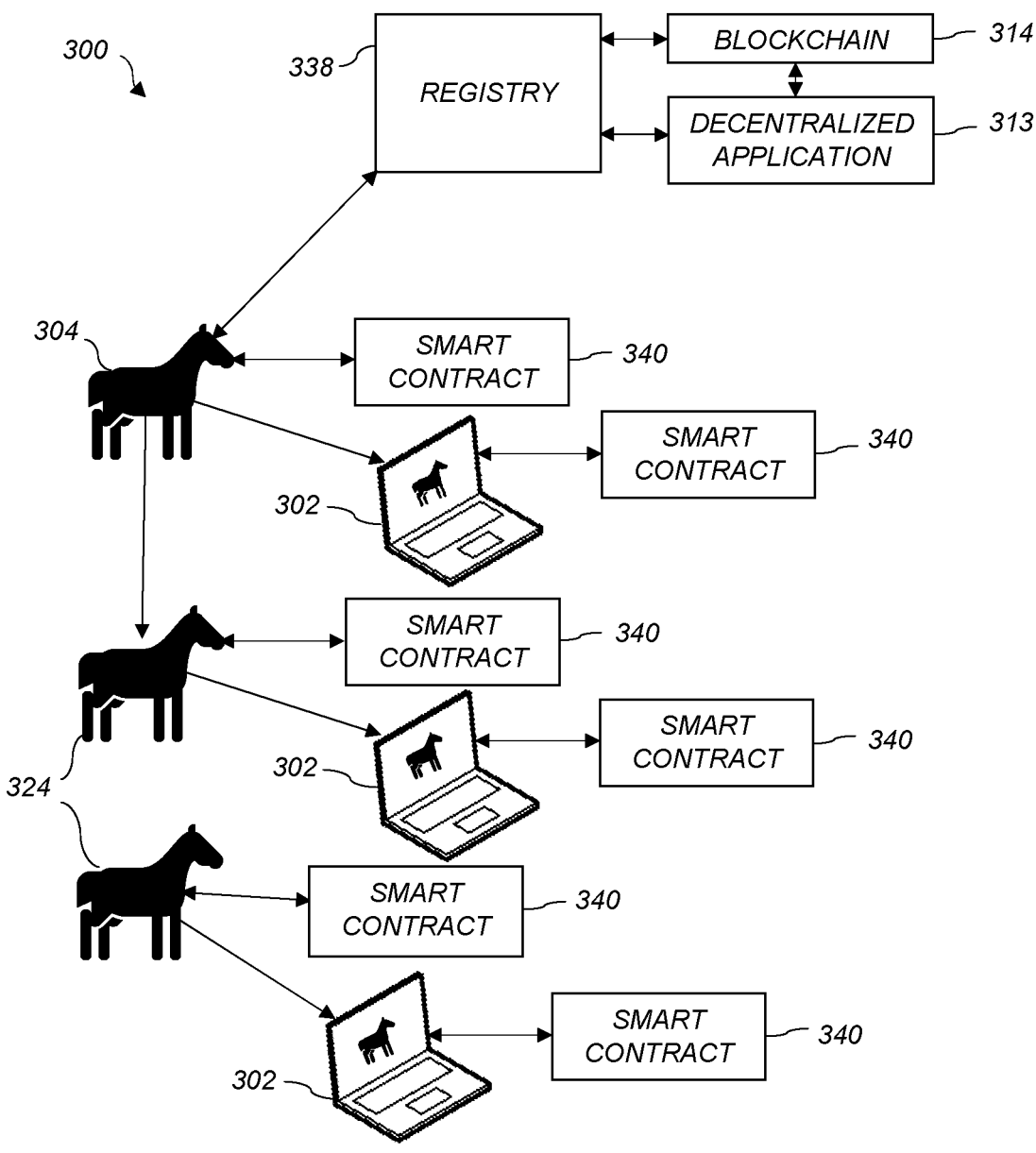
FIG. 3 is a block diagram of yet another embodiment of a system for generating, managing, and displaying non-fungible digital representations of eukaryotic organisms.

Genetic data can be generated by the system 100 based on genetic material 106 gathered from the eukaryotic organism 104. The genetic data can include metadata and/or registration information (such as registration numbers) that corresponds to a registry 388 (for example, as illustrated in FIG. 3) that stores the DNA. The genetic material 106 can vary depending on the design requirements of the system 100 and/or the eukaryotic organism 104.

Biometrics 121 can be gathered from the eukaryotic organism 104. The biometrics 121 can include any suitable identification system of the eukaryotic organism, except those covered by the genetic material 105. The biometrics 121 can be gathered without using genetic materials 106 or sampling. It is appreciated that the system 100 can be operated with the genetic material 106 and/or the biometrics 121. For example, If genetic material 106 is unavailable for sampling, biometrics 121 of the eukaryotic organism 104 can be used for identification, and vice versa.

The database 108 can store the genetic data and/or the biometric data 122 generated from the genetic material 106 and/or the biometrics 121. The database 108 can include a processor 110 and a non-transitory computer-readable medium 112, having instructions stored thereon which are executable by the processor 110. When the instructions are executed, the system 100 can generate genetic data that is based on gathered genetic material 106 from the eukaryotic organism 104, record the genetic data on the blockchain 114, and/or generate and display the non-fungible digital representation 102 of the eukaryotic organism 104 that is based on the genetic data on the blockchain 114. The genetic material 106 can vary depending on the design requirements of the system 100, the non-fungible digital representation 102, the eukaryotic organism 104, the genetic material 106, and/or the blockchain 114. As used herein database 108 is understood to mean any suitable device, computer, centralized computer, or centralized database computer, that contains all of the computer and/or mechanical components necessary to carry out the methods and create the systems described herein.

The decentralized application 113 can be connected to any suitable number of decentralized networks and/or the blockchain 114. The decentralized application 113 allows users to connect directly without human intervention or a centralized database (such as the database 108). However, in some embodiments, the decentralized application 113 can be utilized with the database 108. The decentralized application 113 can operate autonomously. Data from the decentralized application 113 can be cryptographically stored in the blockchain 114. The decentralized application 113 can vary depending on the design requirements of the system 100 and/or the blockchain 114. In various embodiments, the system 100 may be implemented on Web3 or another version of the internet that is entirely decentralized through the use of one or more decentralized applications 113.

The blockchain 114 records information, such as the genetic data generated from the genetic material. The blockchain 114 can mint and record NFTs such as the non-fungible digital representation 102 of the eukaryotic organism 104, an NFT for the eukaryotic organism 104 itself, and NFTs for physical clones 124 of the eukaryotic organism 104. The blockchain 114 can provide authenticity and a technical solution for the authenticity of the eukaryotic organism 104 and the distinction between the eukaryotic organism 104 and any number of eukaryotic clones 124 that may exist. The minted NFTs can only have one owner at a time. The blockchain 114 can autonomously manage records such as ownership records 118, health data 120, and/or biometric data 122.

The blockchain 114 can vary depending on the design requirements of the system 100 and/or the non-fungible digital representation 102. It is appreciated that the blockchain 114 can be replaced by any suitable decentralized network or decentralized application 113 to achieve the goals and objectives of the system.

The blockchain 114 can include the Ethereum blockchain or any suitable blockchain 114. The blockchain 114 can be configured to be an immutable record available to the public. The blockchain 114 can vary depending on the design requirements of the system 100, the non-fungible digital representation 102, the eukaryotic organism 104, the genetic material 106, and/or the database 108. The blockchain 114 can include the blockchain ledger 116, which provides a register of all records made on the blockchain 114.

The ownership records 118 can contain the entire chain of title of ownership to one or more of the non-fungible digital representation 102 of the eukaryotic organism 104, the eukaryotic organism 104 itself, and/or the eukaryotic clones 124. In some embodiments, the ownership records 118 are solely updated and governed by the blockchain 114. The ownership records 118 can include NFTs and/or any suitable digital certificate of ownership. It is appreciated that each non-fungible digital representation 102 of the eukaryotic organism 104 and the eukaryotic organism 104 can each have separate owner(s).

The health data 120 can contain the entire health and/or medical history of the eukaryotic organism 104 and/or the eukaryotic clones 124. In certain embodiments, the health data 120 is solely updated and governed by the blockchain 114.

The biometric data 122 can include ear shape, retina recognition, facial recognition, fingerprint recognition, hierarchical triangulation, finger geometry recognition, gait, hand geometry recognition, odor, typing recognition, vein recognition, voice/speaker verification, signature recognition, circadian patterns, health data, saliva, breath, eye representations/scans, stride identifiers, circadian patterns, hair color, or any suitable biometric data 122 of the non-fungible digital representation 102 of the eukaryotic organism 104, the eukaryotic organism 104, and/or the eukaryotic clones 124. In certain embodiments, the biometric data 122 is solely updated and governed by the blockchain 114. In other embodiments, the biometric data 122 can include metadata and/or registration information (such as registration numbers) that corresponds to a registry 338 (illustrated in FIG. 3) that stores the biometric data 122. In some embodiments, the biometric data 122 does not include DNA or genetic data collected from the eukaryotic organism 104.

Figure 2:
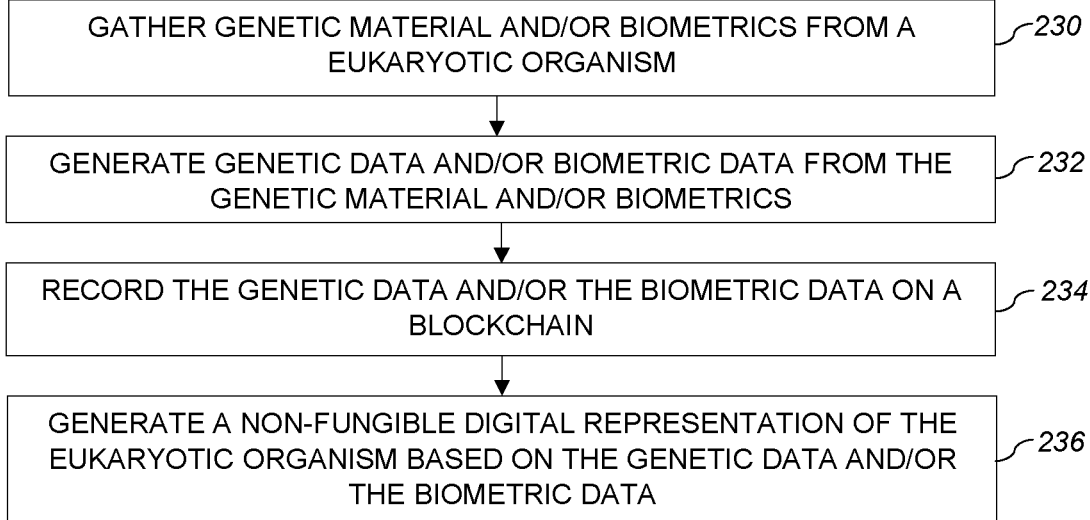
FIG. 2 is a flow chart that illustrates one method for generating, managing, and displaying non-fungible digital representations of eukaryotic organisms.

FIG. 2 is a flow chart that illustrates one method for generating, managing, and displaying non-fungible digital representations 102 (illustrated in FIG. 1) of eukaryotic organisms 104 (illustrated in FIG. 1). It should be appreciated that the various steps described herein can be modified as necessary in the process of generating, managing, and displaying non-fungible digital representations 102 of eukaryotic organisms 104. Additionally, it should also be appreciated that the order of the steps can be modified, certain steps can be omitted, and/or additional steps can be added without limiting the intended scope and breadth of the present invention.

At step 230, genetic material 106 (illustrated in FIG. 1) and/or biometrics 121 (illustrated in FIG. 1) are gathered from the eukaryotic organism 104. In various embodiments, suitable genetic material 106 gathering techniques include saliva, buccal swabs, hair sample collection, and nail sample collection.

At step 232, the genetic data and/or the biometric data 122 (illustrated in FIG. 1) are generated from the genetic material 106 and/or the biometrics 121. In some embodiments, generation techniques for the genetic data include the use of microsatellite markers where a portion of the genome of the eukaryotic organism 104 is analyzed for identification and verification purposes.

At step 234, the genetic data and/or the biometric data 122 are recorded on a blockchain 114 (illustrated in FIG. 1). In some embodiments, only a portion of the genetic data and/or the biometric data 122 is recorded on the blockchain 114. For example, the recordation on the blockchain 114 could only include metadata such as registration numbers that correspond to the genetic data and/or the biometric data 122, the health data 120 (illustrated in FIG. 1), and/or the biometric data 122 (illustrated in FIG. 1). In certain embodiments, specific genetic traits could be recorded on the blockchain 114.

At step 236, the non-fungible digital representations 102 of the eukaryotic organism 104 are generated based on the genetic data and/or the biometric data 122.

FIG. 3 is a block diagram of yet another embodiment of a system 300 for generating, managing, and displaying non-fungible digital representations 302 of eukaryotic organisms 304. In FIG. 3, the system 300 can include the non-fungible digital representation 302, the eukaryotic organism 304, a decentralized application 313, a blockchain 314, physical clones 324 of the eukaryotic organism 304, a registry 338, and/or smart contracts 340.

The registry 338 can store data relating to the eukaryotic organism 304, such as genetic data, ownership data 118 (illustrated in FIG. 1), health data 120 (illustrated in FIG. 1), and/or biometric data 122 (illustrated in FIG. 1). The registry 338 can store registry data (such as registration numbers or URLs that link to the data relating to the eukaryotic organism) on the decentralized application 313, the blockchain 314, and/or any suitable storage location. The registry 338 can issue one or more registration numbers that can be associated with the non-fungible digital representation 302 of the eukaryotic organism 304, the eukaryotic organism 304 itself, and/or any number of corresponding smart contracts 340.

For example, in the embodiment displayed in FIG. 3, the eukaryotic organism 304 will have a registration number and an associated smart contract 340. One or more non-fungible digital representations 302 of the eukaryotic organism 304 will each have a corresponding (i) registration number, and (ii) smart contract 340. Similarly, the physical clones 324 can have their own accompanying (i) smart contracts 340 and (ii) the non-fungible digital representations 302 of the physical clones 324. The non-fungible digital representations 302 of the physical clones 324 can have associated smart contracts 340.

The registry 338 can vary depending on the design requirements of the system 300, the eukaryotic organism 304, the decentralized application 313, and/or the blockchain 314. The registry 338 can include components similar to the database 108 (illustrated in FIG. 1), such as the processor 110 (illustrated in FIG. 1) and the non-transitory computer-readable medium 112 (illustrated in FIG. 1).

The smart contracts 340 can include non-fungible tokens and/or digital certificates that correspond to their accompanying asset (e.g., the eukaryotic organism 304). Digital certificates may be technologically limited in terms of the amount of data they can store. However, as described herein, genetic data in the form of microsatellite marker data can be recorded onto the blockchain 314 to get around these present technical limitations.

FIG. 4 is a flow chart that illustrates yet another method for generating, managing, and displaying non-fungible digital representations 102 (illustrated in FIG. 1) of eukaryotic organisms 104 (illustrated in FIG. 1). It should be appreciated that the various steps described herein can be modified as necessary in the process of generating, managing, and displaying non-fungible digital representations 102 of eukaryotic organisms 104. Additionally, it should also be appreciated that the order of the steps can be modified, certain steps can be omitted, and/or additional steps can be added without limiting the intended scope and breadth of the present invention.

At step 450, genetic material 106 (illustrated in FIG. 1) and/or biometrics 121 are gathered from the eukaryotic organism 104.

At step 452, the genetic data and/or the biometric data 122 are generated from the genetic material 106 and/or the biometrics 121.

At step 454, the genetic data and/or the biometric data 122 are stored on a registry 338 (illustrated in FIG. 3). The registry 338 can include a DNA registry and/or a biometric data registry.

At step 456, a registration number is issued for the eukaryotic organism 104.

At step 458, the registration number for the eukaryotic organism 104 is recorded on one of a decentralized application 113 (illustrated in FIG. 1) and a blockchain 114 (illustrated in FIG. 1).

At step 460, a non-fungible digital representation 102 of the eukaryotic organism 104 is generated based on the genetic data and/or the biometric data 122.

At step 462, a registration number is issued for the non-fungible digital representation 102 of the eukaryotic organism 104.

At step 464, the registration number for the non-fungible digital representation 102 of the eukaryotic organism 104 is recorded on one of the decentralized application 113 and the blockchain 114.

EXAMPLES

The following Examples illustrate the use of the systems and methods of the present invention with various non-exclusive options of biometric data.

Example 1

Specific Sequences of High Phenotypic Visibility, Plus mtDNA

Among biometric data to be considered for use in the invention includes, but is not limited to, a specific gene sequence utilizing traits that would be easily observable in the phenotype-traits like eye color, fur color, coat pattern, skin color, ear shape, 'curly tail,' etc. Additionally, the sequence could include dam line data that could help distinguish between somatic cell clones (but not between twins).

For example, the invention could deploy an assay of single nucleotide polymorphisms (SNPs), including multiplexed mtDNA single nucleotide polymorphisms. Mitochondrial DNA (mtDNA) is a convenient marker for tracing matrilineal inheritance and is widely applied. The invention may seek to construct an assay that combines mtDNA SNPs with somatic SNPs for regions that can allow the casual observer to compare genotype to phenotype—by comparing the somatic SNP data to the phenotype of the animal and/or digital image thereof.

Example 2

Specific Sequences of High Genotypic Variability

In an alternative embodiment of the present invention, biometric data for the invention may include, but is not limited to, specific gene sequences that are selected for regions of high variability.

Figure 5:
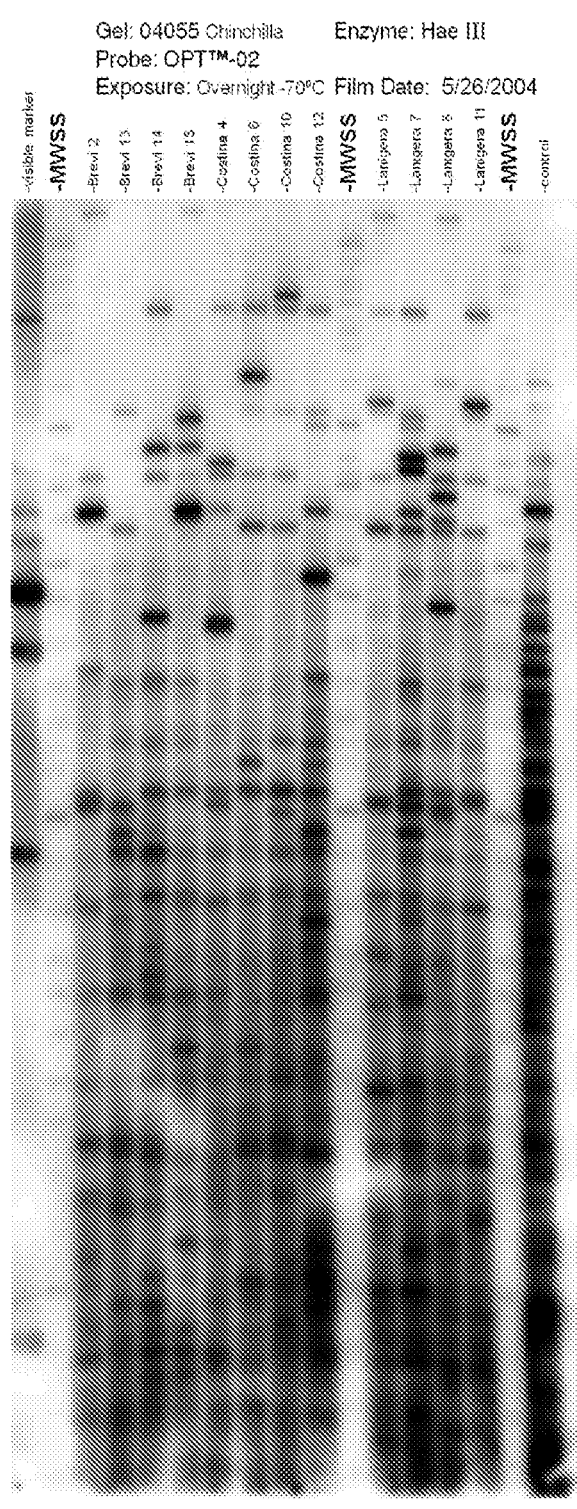
FIG. 5. is a non-exclusive, non-limiting example of a sample DNA profile of a *Chinchilla* that was hybridized by a probe that can be utilized by some embodiments of the method for generating, managing, and displaying non-fungible digital representations of eukaryotic organisms.

For example (see Table 1 and assay below), the use of a microsatellite marker assay that looks at regions of high genetic variance is an alternative embodiment of the present invention. A feasibility study performed on *Chinchilla lanigera* determined the viability of such a sequence as follows:
Summary:

DNA profile assays were performed on 12 samples of *chinchilla*. The sample individuals were representative of three strains: *Lanigera, Brevi,* and *Costina.* The DNA from four samples of each strain was digested independently with two restriction enzymes, BstN I and Hae III. The digested samples were hybridized independently with two probes, OPT-02 and OPT-03. The DNA profile results from two of these probe/enzyme combinations exhibited significant genetic variation among the sample individuals. A sample DNA profile of a *Chinchilla* that was hybridized by a OPT-02 probe is illustrated in FIG. 5. It is concluded that these DNA profile tests are well suited to address questions concerning individual identity (i.e., registry) and parentage verification in chinchillas.
Methodology:

DNA was isolated from each blood sample using a standard organic extraction procedure. The DNA samples were then cleaved independently with restriction enzymes BstN I and Hae III. The digested DNA fragments were separated by size using gel electrophoresis, transferred to a nylon membrane, and then hybridized independently with radioactively-labeled multi-locus DNA probes OPT™-02 and OPT™-03. Each time one changes the restriction enzyme, the DNA is "cut" into a different family of fragments. Each time a different probe is used, an independent subset of the fragments (hence the genome) is assayed. Thus every probe/enzyme combination produces an entirely different DNA profile for each test sample.

Individuals are found to share genetic information if they display a genetic marker (band) at the same relative positions in their respective DNA profiles. The more bands two individuals share (Band Sharing Coefficient, BSC close to 1.0), the more closely related they are. The fewer bands two individuals share (BSC close to 0), the less related. In addition, all DNA profile bands seen in an individual must appear in the DNA profile of its dam and/or sire.
Results:

Four DNA profile results were generated for each test sample. The results were inspected to choose the probe/enzyme combinations that detect the greatest variation among the samples. The level of variation detected by probe/enzyme combinations OPT-02/Hae III and OPT-03/Hae III was found to be (sufficient) to address questions concerning individual identity (i.e., registry) and parentage verification in chinchillas. The DNA profiles from these two probe/enzyme combinations were analyzed further.

Molecular sizes were assigned to the genetic markers (bands) in each sample lane by comparison to molecular sizing standards. The band-sharing coefficient (BSC, also called the similarity index, SI) was determined for each sample pair. Values were generated for each probe and for the combined probes. These values are shown in Table 1 below.

The average number of bands per individual was 14, 19, and 33 for probes OPT-02, OPT-03, and the combined probes, respectively. The average band-sharing was 0.48, 0.47, and 0.47 for probe OPT-02, OPT-03, and the combined probes, respectively. The range of BSC values (0.28-0.74 for the combined probes) suggests that some of the test samples were potentially from related or inbred individuals. Randomly-bred unrelated individuals usually display a BSC value of 0.2-0.5, while first-order relatives usually exhibit a BSC value of 0.5-0.9.

TABLE 1

| Band-Sharing Coefficients (BSC) for each sample pair | | | | | | | | | | | |
|---|---|---|---|---|---|---|---|---|---|---|---|
| Probe OPT ™-02 | | | | | | | | | | | |
| | B 2 | B 13 | B 14 | B 15 | C 4 | C 6 | C 10 | C 12 | L 5 | L 7 | L 8 | L 11 |
| B 2 | 1.00 | 0.33 | 0.42 | 0.64 | 0.52 | 0.37 | 0.40 | 0.40 | 0.36 | 0.50 | 0.55 | 0.44 |
| B 13 | | 1.00 | 0.50 | 0.48 | 0.35 | 0.44 | 0.40 | 0.56 | 0.57 | 0.44 | 0.41 | 0.52 |
| B 14 | | | 1.00 | 0.64 | 0.43 | 0.52 | 0.64 | 0.48 | 0.50 | 0.44 | 0.41 | 0.44 |
| B 15 | | | | 1.00 | 0.58 | 0.50 | 0.54 | 0.62 | 0.41 | 0.42 | 0.53 | 0.50 |
| C 4 | | | | | 1.00 | 0.38 | 0.42 | 0.42 | 0.37 | 0.45 | 0.43 | 0.54 |
| C 6 | | | | | | 1.00 | 0.71 | 0.43 | 0.45 | 0.40 | 0.56 | 0.40 |
| C 10 | | | | | | | 1.00 | 0.46 | 0.62 | 0.55 | 0.53 | 0.57 |

TABLE 1-continued

Band-Sharing Coefficients (BSC) for each sample pair

| | C 12 | L 5 | L 7 | L 8 | L 11 |
|---|---|---|---|---|---|
| C 12 | 1.00 | 0.28 | 0.67 | 0.33 | 0.43 |
| L 5 | | 1.00 | 0.44 | 0.48 | 0.65 |
| L 7 | | | 1.00 | 0.43 | 0.40 |
| L 8 | | | | 1.00 | 0.38 |
| L 11 | | | | | 1.00 |

Average # of bands per ind. 14     Range of bands per ind. 11-20
Average BSC 0.48     Range of BSC 0.28-0.71

Probe OPT ™-03

| | B 2 | B 13 | B 14 | B 15 | C 4 | C 6 | C 10 | C 12 | L 5 | L 7 | L 8 | L 11 |
|---|---|---|---|---|---|---|---|---|---|---|---|---|
| B 2 | 1.00 | 0.71 | 0.40 | 0.62 | 0.53 | 0.45 | 0.41 | 0.21 | 0.39 | 0.30 | 0.29 | 0.27 |
| B 13 | | 1.00 | 0.69 | 0.72 | 0.59 | 0.52 | 0.71 | 0.46 | 0.56 | 0.47 | 0.29 | 0.43 |
| B 14 | | | 1.00 | 0.80 | 0.63 | 0.63 | 0.57 | 0.55 | 0.54 | 0.21 | 0.34 | 0.37 |
| B 15 | | | | 1.00 | 0.56 | 0.56 | 0.62 | 0.59 | 0.54 | 0.35 | 0.31 | 0.29 |
| C 4 | | | | | 1.00 | 0.58 | 0.47 | 0.62 | 0.39 | 0.30 | 0.35 | 0.32 |
| C 6 | | | | | | 1.00 | 0.71 | 0.61 | 0.61 | 0.32 | 0.39 | 0.35 |
| C 10 | | | | | | | 1.00 | 0.62 | 0.72 | 0.26 | 0.29 | 0.27 |
| C 12 | | | | | | | | 1.00 | 0.59 | 0.31 | 0.36 | 0.33 |
| L 5 | | | | | | | | | 1.00 | 0.41 | 0.28 | 0.31 |
| L 7 | | | | | | | | | | 1.00 | 0.60 | 0.52 |
| L 8 | | | | | | | | | | | 1.00 | 0.65 |
| L 11 | | | | | | | | | | | | 1.00 |

Average # of bands per ind. 19     Range of bands per ind. 14-30
Average BSC 0.47     Range of BSC 0.21-0.80

Combined Probes

| | B 2 | B 13 | B 14 | B 15 | C 4 | C 6 | C 10 | C 12 | L 5 | L 7 | L 8 | L 11 |
|---|---|---|---|---|---|---|---|---|---|---|---|---|
| B 2 | 1.00 | 0.55 | 0.41 | 0.63 | 0.53 | 0.41 | 0.41 | 0.28 | 0.38 | 0.38 | 0.41 | 0.34 |
| B 13 | | 1.00 | 0.61 | 0.63 | 0.49 | 0.48 | 0.58 | 0.50 | 0.56 | 0.46 | 0.35 | 0.47 |
| B 14 | | | 1.00 | 0.74 | 0.55 | 0.58 | 0.60 | 0.52 | 0.52 | 0.30 | 0.38 | 0.40 |
| B 15 | | | | 1.00 | 0.57 | 0.53 | 0.58 | 0.60 | 0.49 | 0.38 | 0.41 | 0.37 |
| C 4 | | | | | 1.00 | 0.49 | 0.45 | 0.54 | 0.38 | 0.36 | 0.39 | 0.41 |
| C 6 | | | | | | 1.00 | 0.71 | 0.53 | 0.53 | 0.35 | 0.48 | 0.38 |
| C 10 | | | | | | | 1.00 | 0.55 | 0.68 | 0.38 | 0.41 | 0.40 |
| C 12 | | | | | | | | 1.00 | 0.46 | 0.45 | 0.35 | 0.37 |
| L 5 | | | | | | | | | 1.00 | 0.42 | 0.38 | 0.46 |
| L 7 | | | | | | | | | | 1.00 | 0.52 | 0.47 |
| L 8 | | | | | | | | | | | 1.00 | 0.52 |
| L 11 | | | | | | | | | | | | 1.00 |

Average # of bands per ind. 33     Range of bands per ind. 28-50
Average BSC 0.47     Range of BSC 0.28-0.74

Example 3

Specific Sequences of High Genotypic Variability

In yet another alternative embodiment of the present invention, biometric data for the invention may include, but is not limited to, specific gene sequences that are selected for regions of high variability from other registries, into non-fungible digital representations and/or non-fungible tokens recorded on a blockchain, to further strengthen the registration of the organism.

For example, the use of a microsatellite marker assay that looks at regions of high genetic variance is an alternative embodiment of the present invention. A genetic marker test report study performed on an Arabian mare Safina Al Badia (www.vgl.ucdavis.edu/verify; report ID 0960-9030-8445-8160 Mar. 22, 2021), determined the following genetic markers that can be used in accordance to an embodiment of the present invention.

Genetic Markers

| LOCUS | TYPE |
|---|---|
| AHT4 | J |
| ASB17 | MR |

-continued

| LOCUS | TYPE |
|---|---|
| HMS2 | LP |
| HMS7 | L |
| LEX3 | HM |
| AHT5 | JM |
| ASB2 | Q |
| HMS3 | P |
| HTG10 | OR |
| LEX33 | LO |
| AME | X |
| ASB23 | IJ |
| HMS6 | LM |
| HTG4 | KM |
| VHL20 | LR |

Thus, NFDRs and NFTs are rising to the forefront of mainstream audiences as their usability increases. Digital assets will exist not on a single platform, but rather technology will open up liquidity cross-chain, across a metaverse of multiple blockchains. Ownership of digital assets will not only be tied to a specific platform. Owners of digital assets will be able to bring these assets across different applications and experiences in the metaverse. According to embodiments of the present invention, NFDRs and NFTs will be able to translate across a broad ecosystem of digital assets, and allow owners of living/biological/eukaryotic organisms to take these real world registered organisms, digital twins, or fanciful renditions into the metaverse at large.

The registration and authentication of organisms must adapt and change as the world evolves and as new technologies emerge. By coupling biological data with blockchain governance, the embodiments of the present invention will allow registered tangible living/biological/eukaryotic organisms and genetic materials of these organisms, such as SNPs, to enter the decentralized metaverse, and allow the intangible digital counterpart to be tethered to a real-world organism. This pairing will give exclusivity and utility to both counterparts.

It is appreciated that one or more parties may build the system or perform the methods as described herein. It should be noted that, as used in this specification and the appended claims, the singular forms "a," "an," and "the" include plural referents unless the content and/or context clearly dictates otherwise. It should also be noted that the term "or" is generally employed in its sense, including "and/or" unless the content or context clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

It is recognized that the figures shown and described are not necessarily drawn to scale, and that they are provided for ease of reference and understanding, and for relative positioning of the structures.

The headings used herein are provided for consistency with suggestions under 37 CFR 1.77 or otherwise to provide organizational cues. These headings shall not be viewed to limit or characterize the invention(s) set out in any claims that may issue from this disclosure. As an example, a description of a technology in the "Background" is not an admission that technology is prior art to any invention(s) in this disclosure. Neither is the "Summary" or "Abstract" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

It is understood that although a number of different embodiments of the systems and methods for generating, managing, and displaying non-fungible digital representations of living organisms have been illustrated and described herein, one or more features of any one embodiment can be combined with one or more features of one or more of the other embodiments, provided that such combination satisfies the intent of the present invention.

While a number of exemplary aspects and embodiments of the systems and methods for generating, managing, and displaying non-fungible digital representations of living organisms have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope, and no limitations are intended to the details of construction or design herein shown.

What is claimed is:

1. A system for generating, managing, and displaying a non-fungible digital representation of a eukaryotic organism, the system comprising:
   a blockchain; and
   a database including a processor and a non-transitory computer readable medium having instructions stored thereon which are executable by the processor and which, when executed, cause the system to:
   generate genetic data that is based on gathered genetic material from the eukaryotic organism;
   record the genetic data on the blockchain; and
   generate and display the non-fungible digital representation of the eukaryotic organism that is based on the genetic data on the blockchain, the non-fungible digital representation of the eukaryotic organism including a virtual twin of the eukaryotic organism, the non-fungible digital representation of the eukaryotic organism including a non-fungible token that demonstrates ownership of at least one of the eukaryotic organism and the non-fungible digital representation of the eukaryotic organism, the non-fungible token being configured to be minted with metadata that includes a total number of (i) virtual twins, and (ii) eukaryotic clones of the eukaryotic organism.

2. The system of claim 1 wherein the genetic data includes genetic material comprising deoxyribonucleic acid data, ribonucleic acid data, single nucleotide polymorphisms data, and nucleic acid fragments, alone or in combination thereof, collected from the eukaryotic organism.

3. The system of claim 1 wherein the genetic data includes biometric data.

4. The system of claim 3 wherein the biometric data includes at least one of (i) vocalization data of the eukaryotic organism, (ii) eye characteristics of the eukaryotic organism, (iii) stride identifiers of the eukaryotic organism, (iv) circadian patterns of the eukaryotic organism, (v) health data of the eukaryotic organism, and (vi) face scans of the eukaryotic organism.

5. The system of claim 4 wherein the non-fungible digital representation of the eukaryotic organism includes the biometric data.

6. The system of claim 1 wherein the genetic data is recorded in the metadata of the non-fungible token.

7. The system of claim 1 wherein the metadata includes single nucleotide polymorphism data.

8. The system of claim 1 wherein the metadata includes species-specific biometric data that demonstrates variation among the virtual twins.

9. A method for generating, managing, and displaying a non-fungible digital representation of a eukaryotic organism, the method comprising the steps of:
   generating genetic data that is based on gathered genetic material from the eukaryotic organism;
   recording the genetic data on a blockchain; and
   generating and displaying the non-fungible digital representation of the eukaryotic organism that is based on the genetic data on the blockchain, the non-fungible digital representation of the eukaryotic organism includes a virtual twin of the eukaryotic organism, the non-fungible digital representation of the eukaryotic organism including a non-fungible token that demonstrates ownership of at least one of the eukaryotic organism and the non-fungible digital representation of the eukaryotic organism, the non-fungible token being configured to be minted with metadata that includes a total number of (i) virtual twins, and (ii) eukaryotic clones of the eukaryotic organism.

10. The method of claim 9 wherein the genetic data includes genetic material comprising deoxyribonucleic acid data, ribonucleic acid data, single nucleotide polymorphisms data, and nucleic acid fragments, alone or in combination thereof, collected from the eukaryotic organism.

11. The method of claim 9 wherein the genetic data includes biometric data.

12. The method of claim 11 wherein the biometric data includes at least one of (i) vocalization data of the eukaryotic organism, (ii) eye characteristics of the eukaryotic organism, (stride identifiers of the eukaryotic organism, (iv) circadian patterns of the eukaryotic organism, (v) health data of the eukaryotic organism, and (vi) face scans of the eukaryotic organism.

13. The method of claim 12 wherein the non-fungible digital representation of the eukaryotic organism includes the biometric data.

14. The method of claim 9 wherein the genetic data is recorded in the metadata of the non-fungible token.

15. The method of claim 14 wherein the metadata includes single nucleotide polymorphism data.

16. The method of claim 9 wherein the metadata includes species-specific biometric data that demonstrates variation among the virtual twins.

17. The method of claim 9 wherein the non-fungible digital representation of the eukaryotic organism is configured to be displayed in at least one of a virtual world, an augmented reality, and a hologram.

18. A system for generating, managing, and displaying a non-fungible digital representation of a eukaryotic organism, the system comprising: a registry including a processor and a non-transitory computer-readable medium having instructions stored thereon which are executable by the processor and which, when executed, cause the system to: generate genetic data that is based on gathered genetic material from the eukaryotic organism; store the genetic data on the registry; issue a registration number for the eukaryotic organism based on the genetic data stored on the registry; and generate and display the non-fungible digital representation of the eukaryotic organism that is based on the genetic data, the non-fungible digital representation of the eukaryotic organism includes a virtual twin of the eukaryotic organism, the non-fungible digital representation of the eukaryotic organism includes anon-fungible token that is configured to be minted with metadata that includes a total number of (i) virtual twins, and (ii) eukaryotic clones of the eukaryotic organism.

19. The system of claim 2 wherein the genetic data is recorded in the metadata of the non-fungible token.

* * * * *